United States Patent [19]

Hufstedler et al.

[11] 3,979,715
[45] Sept. 7, 1976

[54] METHOD AND SYSTEM FOR ACHIEVING VIBRATOR PHASE LOCK

[75] Inventors: Alferd Gene Hufstedler, Dallas; Ronald Ray Weaver, Houston; Billy Ray Slater, Richardson, all of Tex.

[73] Assignee: Texas Instruments Incorporated, Dallas, Tex.

[22] Filed: Aug. 28, 1974

[21] Appl. No.: 501,410

[52] U.S. Cl. ............... 340/15.5 TD; 340/15.5 TA; 340/17 R; 181/121
[51] Int. Cl.² ........................................ G01V 1/14
[58] Field of Search ....... 340/17, 15.5 TA, 15.5 TC, 340/15.5 TD; 181/121

[56] References Cited
UNITED STATES PATENTS

| | | | |
|---|---|---|---|
| 3,761,874 | 9/1973 | Landrum, Jr. | 340/17 |
| 3,858,170 | 12/1974 | Freeman et al. | 340/17 |
| 3,881,167 | 4/1975 | Pelton et al. | 340/15.5 TA |

Primary Examiner—Howard A. Birmiel
Attorney, Agent, or Firm—Harold Levine; Rene E. Grossman; Leo N. Heiting

[57] ABSTRACT

An improved controller for vibratory seismic energy sources insures that the energy imparted to the ground by the source is in phase with the reference signal. Phase lock is achieved in a manner which minimizes the effects of the attendant frequency distortion. On upsweeps when the phase error is greater than some threshold level, phase lock is achieved by slowing down the drive signal, thereby introducing frequency distortion which falls below the bandpass of the sweep signal. On downsweeps when the phase error is above some selected threshold, phase lock is achieved by speeding up the drive signal, thereby resulting in frequency distortion which falls above the bandpass of the sweep signal.

17 Claims, 6 Drawing Figures

METHOD AND SYSTEM FOR ACHIEVING VIBRATOR PHASE LOCK

This invention relates to the control of seismic energy sources and in particular to the phase control of vibratory seismic energy sources.

In present day seismic exploration, it is common practice to employ vibratory seismic energy sources such as the Vibroseis* seismic source. In utilizing these vibratory energy source it is also common practice to employ a drive signal such that the energy imparted to the ground takes the form of a "chirp signal", that is, a sinusoidal signal with a linearly increasing or decreasing frequency. A difficulty involved in the use of these vibratory sources stems either from manufacturing variations in the sources themselves or from variations in the instrument to ground coupling conditions. As a result of these variations, the wave shape of the signal actually imparted to the ground is not always a faithful replica of the reference signal. Of particular interest with respect to the present invention is the fact that the phase of the signal imparted to the ground may vary in an unpredictible fashion from that of the reference signal.

* Trade Mark of Continental Oil Company only to the extent that the signals imparted to the ground by each of the vibratory sources are mutually in phase. This in turn will be true only to the extent that the signals imparted to the ground by each of the vibratory sources are in phase with the common reference signal.

One method of controlling the tracking of the vibratory sources has been to simply check the phase lock of each of the sources periodically; at the beginning of each day of prospecting for example. Each of the sources is adjusted so as to achieve a satisfactory degree of phase lock. This method, however, does not correct excessive phase deviations resulting from instrument to ground coupling variations. In addition to the morning test procedure it has become known in the art to employ an electronic feedback loop in the control circuits of each source. The feedback loop compares the base plate signal with the reference signal and as nonsimilarity occurs the loop adjusts the base plate drive signal to insure that the base plate motion tracks the reference signal. Existing feedback systems of this type have been designed to adjust the phase of the drive signal in a direction which will require the least amount of correction to achieve phase lock. This procedure is followed irrespective of whether the reference chirp signal is in the upsweep or downsweep mode, that is, whether the frequency of the chirp signal is linearly increasing or decreasing. Thus, when the phase of the baseplate signal lags that of the reference signal by less than 180° the feedback loop increases the frequency of the drive signal temporarily so as to bring the baseplate and reference signals into phase lock. Similarly, if the phase of the baseplate signal leads that of the reference signal by less that 180° the frequency of the drive signal is temporarily reduced so as to allow the baseplate signal to drop back into phase with the reference signal. This procedure is followed irrespective of the frequency distortion introduced in the baseplate signal as a result of the corrective action. This resultant frequency distortion often has a degrading effect on subsequent processing of the data received by the geophones.

The present invention accomplishes the phase correction in such a way as to insure that the attendant frequency distortion does not have a degrading effect on subsequent processing. As noted above, it is common practice to utilize a matched filter operation on the data received by the geophones. Typically, the matched filter impulse response is the time-reverse of the reference wave form. Since a matched filter with this impulse response will tend to reject those frequency components in the geophone output which are not contained in the reference waveform, it follows that subsequent processing will not be materially degraded if the phase correction introduces only frequency distortion lying outside the bandpass of the reference waveform. Phase correction according to the method of the present invention is such that it introduces frequency distortion with frequency components tending to lie outside the bandpass of the reference waveform.

If the phase correction is made during the early portions of the reference waveform, the baseplate signal will tend to remain in phase with the reference waveform during the remainder of the reference waveform and little subsequent phase correction will be required. Accordingly, the primary consideration is the nature of the frequency distortion introduced by phase correction during the early portions of the reference waveform.

In general, since the waveform of the reference signal is approximately sinusoidal over any relatively short time gate, the phase of the baseplate signal may be brought into lock with that of the reference signal by either advancing or delaying the drive signal by an appropriate amount. In accordance with the method of the present invention, when the reference signal is in the upsweep mode and the phase of the baseplate signal lags that of the reference signal by relatively large values, the phase error is corrected by slowing down the drive signal so as to allow the baseplate signal to fall back into phase with the reference signal. Since this correction is accomplished during the first few cycles of the reference signal, it necessarily follows that the frequency content of the baseplate signal during the correction period will lie below the lowest frequencies of the reference signal. If the phase angle by which the baseplate signal lags the reference signal is relatively small, however, the correction is accomplished by speeding up the drive signal temporarily so as to allow the baseplate signal to catch up with the reference signal. While this procedure may tend to introduce distortion falling within the bandpass of the reference signal, the amount of correction required is small and little frequency distortion results. In the preferred embodiment of the invention the threshold level dividing the two methods of operation is 90° of phase lag. In other words, when the phase of the base plate signal lags that of the reference signal by 90° or less, the drive signal is speeded up. When the phase lag is between 90° and 360°, the drive signal is slowed down.

When the reference signal is in the downsweep mode the converse method of correction is employed. If the phase angle of the baseplate signal leads that of the reference signal by relatively large values (90° to 360° in the preferred embodiment) the drive signal is speeded up so as to achieve phase lock. If the phase error, however, is relatively small (less than 90° in the preferred embodiment) phase lock is achieved by slowing down the drive signal temporarily.

In accordance with the preferred embodiment of the present invention, the phases of the reference signal and baseplate signal are compared over a measurement time gate equal in length to the period of one cycle of the reference signal. During the next half cycle of the reference signal the system takes corrective action so as to drive the baseplate signal toward phase lock. Since in general, it is not always possible to achieve perfect phase lock during one half cycle of the reference waveform this procedure is repeated cyclically so as to achieve exact phase lock.

It will be seen, therefor, that an object of the invention is to provide a method and system for insuring that the baseplate signal of a vibratory seismic source is in phase with the reference signal.

It is a further object of the invention to provide an automatic method and system for insuring that the baseplate signal of a vibratory seismic source remains in phase with the reference signal despite manufacturing variations in the sources themselves and variations in the source-to-ground coupling conditions.

It is still a further object of the invention to provide a method and system for insuring that the phase of the baseplate signal of a vibratory seismic source remains locked to that of the reference signal wherein the frequency content of distortions associated with the necessary phase corrections lies outside the band of frequencies contained by the reference signal.

It is another object of the invention to provide a method and system wherein relatively large phase corrections for reference signals in the up-sweep mode are accomplished by slowing down the drive signal to the seismic source, while relatively large phase corrections when the reference signal is in the down-sweep mode are accomplished by spending up the drive signal to the seismic source.

Other objects and features of the invention will become clear by consideration of the following detailed description in connection with the drawings wherein.

Figure 1:
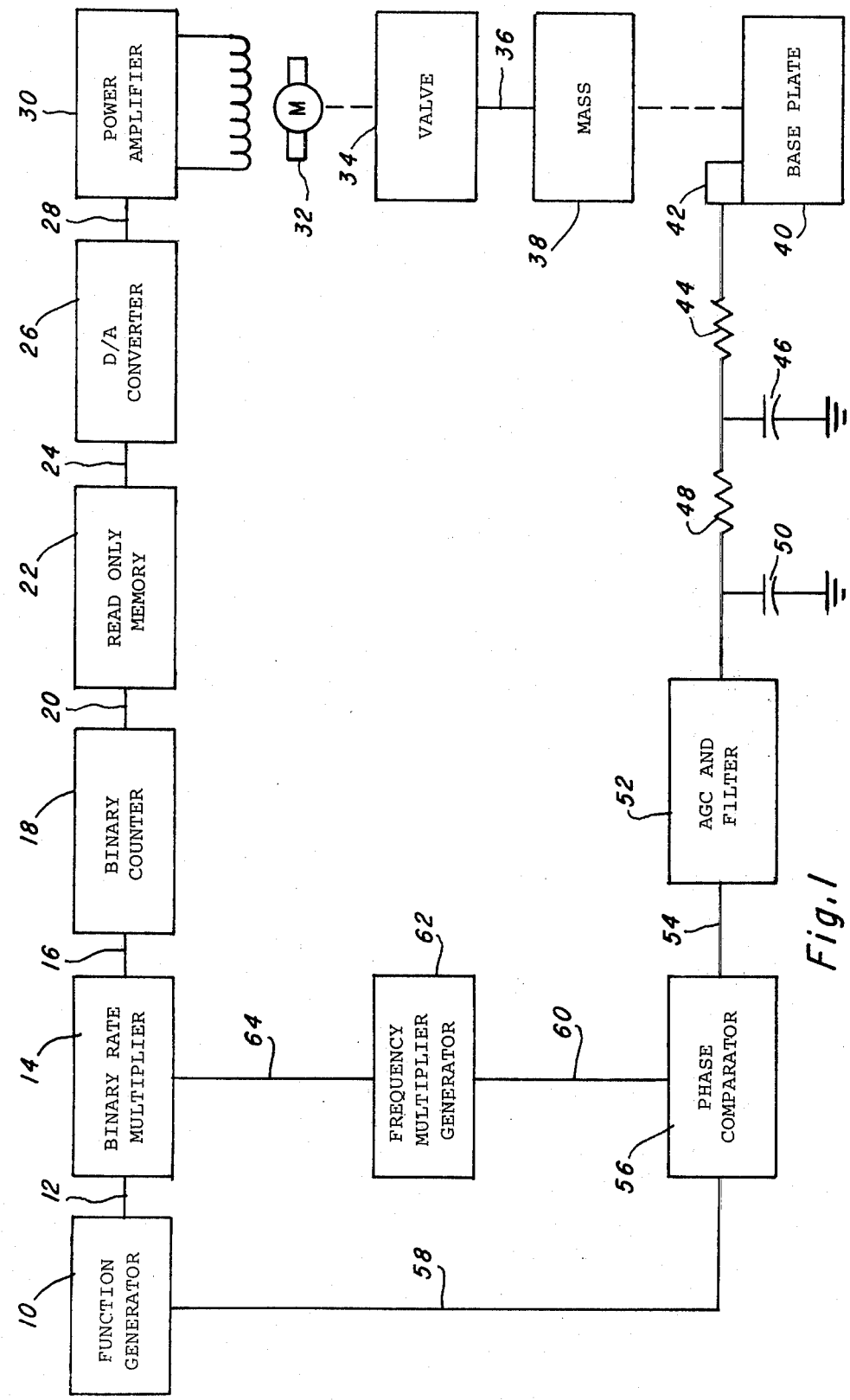
FIG. 1 shows a prior art system with the improvements added by the invention.

Consideration of the block diagram of FIG. 1 will aid in understanding the relevant characteristics of prior art systems as well as certain general characteristics of the present invention. A function generator 10 provides a pulse train on line 12 which for the present, in the interest of clarity, may be considered to have a constant pulse repetition rate. This pulse train is an input to binary rate multiplier (BRM) 14 whose output constitutes a second pulse train on line 16. As is well known in the art, the pulse repetition rate of the output pulse train appearing on line 16 will be the product of the pulse repetition rate of the input pulse train appearing on line 12 and a fraction whose numerator is represented by the binary number appearing on line 64. It will be seen, therefore, that the pulse repetition rate of the pulse train on line 16 will be less than that of the pulse train appearing on line 12. The pulse train appearing on line 16 is counted by binary counter 18, whose output count on line 20 sequentially addresses word locations of read only memory (ROM) 22. The sequential word locations of ROM 22 contain sequential time samples of the amplitude of a sinusoidal function. It will be understood by those skilled in the art, therefore, that the ROM output appearing on line 24 will constitute a digital time series, the individual values of which represent periodic samples of a sinusoidal function. The frequency of this sampled function will be controlled in accordance with the rate of which the count on line 20 polls the address locations of ROM 22. This polling rate is in turn controlled by the pulse repetition rate appearing on line 16.

The time series appearing on line 24 is converted to an analog sinusoidal signal by a conventional digital to analog converter 26. The analog signal on line 28 is amplified by power amplifier 30 and used to control motor 32. Motor 32 is in turn mechanically coupled to valve 34 which controls the flow of hydraulic fluid to mass 38, this control being shown symbolically by line 36. The time-varying flow of hydraulic fluid causes mass 38 to oscillate along a vertical axis. Baseplate 40 which is hydraulically coupled to mass 38 imparts the oscillatory motion to the underlying earth material.

It will be seen from the foregoing that the waveform and freqeuncy of the signal ultimately imparted to the ground by baseplate 40 are determined by the pulse repetition rate of function generator 10. With the exception of BRM 14 all of the elements of the system described to this point are known in the art, these elements having been previously used in vibratory seismic source systems. As pointed out above, one difficulty with this type of system is the occurence of random phase variations between the reference signal and the signal actually imparted to the earth. The remainder of the system illustrated in FIG. 1 provides a unique method for correcting the phase of the baseplate signal so as to make it coincide with the phase of the reference signal.

There is shown rigidly fixed to baseplate 40 an accelerometer 42. One accelerometer which may be used in the practice of the invention is a model EA-26 accelerometer manufactured by Electro-Technical Labs of Houston, Texas. Coupled to the output of accelerometer 42 is an RC combination comprises of resistor 44 and capacitor 46. This RC combination at its output provides the approximate integral of the accelerometer signal. A second stage of integration is provided by the combination of resistor 48 and capacitor 50. Thus, the signal appearing at the output of resistor 48 is approximately the second order integral of the accelerometer signal, and therefore represents approximately the time-varying displacement of baseplate 40. This displacement signal is amplified, filtered and clipped by AGC and filter unit 52 so as to provide on line 54 a square wave whose zero crossings correspond to the zero crossings of the baseplate displacement. In other words, the square wave appearing on line 54 represents the polarity of the baseplate displacement. The polarity of the baseplate displacement is compared with the polarity of the reference signal appearing on line 58 by phase comparator 56. The phase comparator 56 provides on line 60 an output signal indicative of whether the baseplate displacement leads or lags the reference signal and the degree of such lead or lag. This lead/lag information is used in frequency multiplier generator 62 to generate a binary number on line 64 which in turn is the numerator of the fraction employed in BRM 14 to multiply the pulse repetition rate appearing on line 12.

The frequency multiplier generator 62 is structured such that when the phase error signal appearing on line 60 indicates zero phase error, the binary number on line 64 will set the fraction employed to BRM 14 to one-half. Under these circumstances the pulse repetition rate appearing on line 16 will be one-half that of the pulse repetition rate appearing on line 12. In accordance with the principles of the invention, when the phase error signal appearing on line 60 indicates that the phase of the baseplate displacement leads or lags that of the reference signal the binary number generated by frequency multiplier generator 62 will temporarily cause the fraction employed in BRM 14 to depart from the value of one-half so as to properly adjust the pulse repetition rate appearing on line 16.

Figure 2:
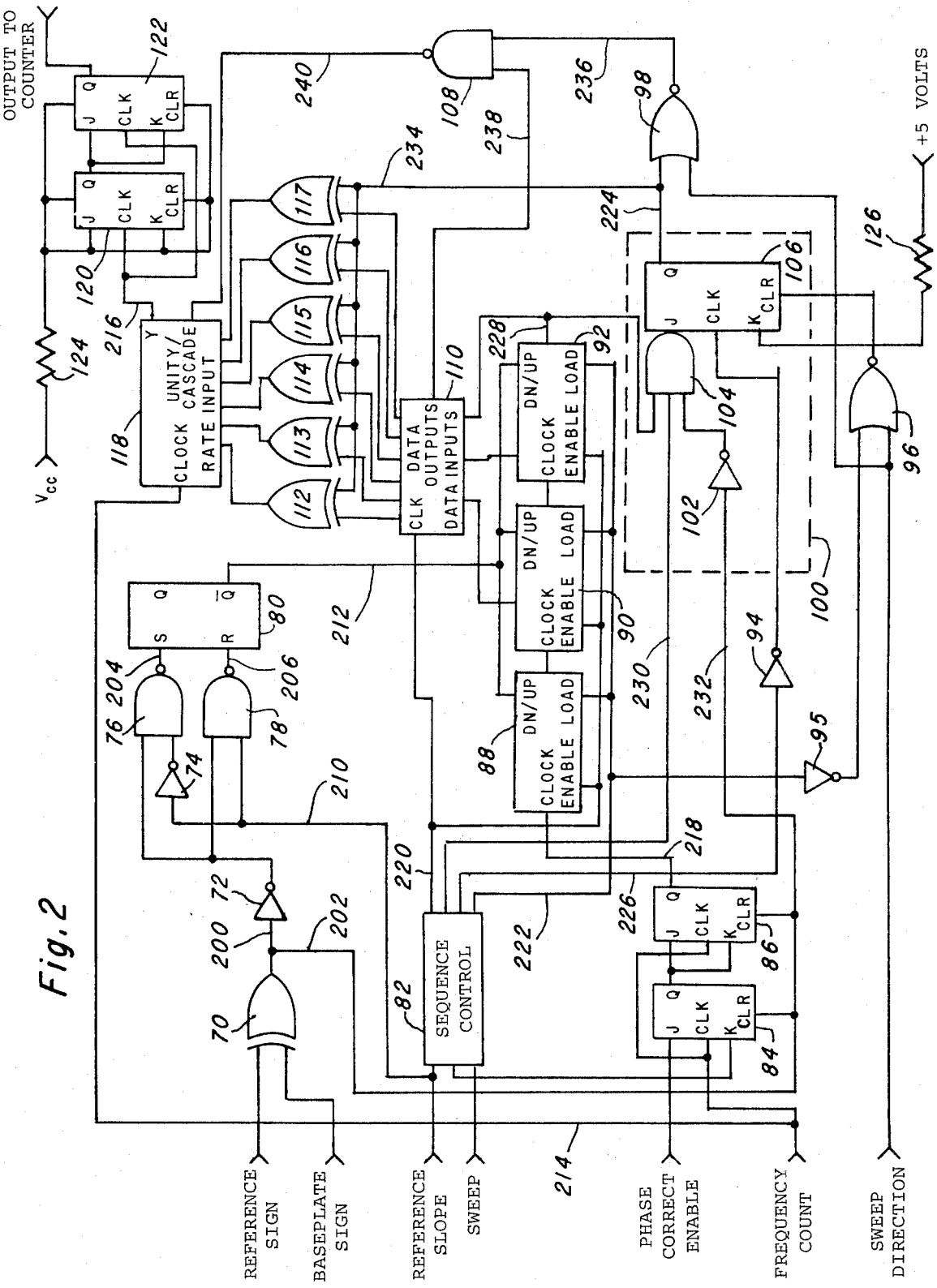
FIG. 2 is a circuit diagram of the phase controller.

The operation of BRM 14, frequency multiplier generator 62, and phase comparator 56 may be understood in greater detail by a consideration of the circuit diagram of FIG. 2.

Devices for performing the majority of the logic functions shown in FIG. 2 are available in integrated circuit form, the following Texas Instruments Incorporated device numbers having been used in the preferred embodiment. Exclusive OR gates such as 70 and 112-117 are SN 7486N type integrated circuits. Inverters such as units 72, 74, 94 and 95 may be implemented with an SN 7404N. NAND gates, such as units 76, 78 and 108 may be a model SN 7400N. Set-reset flip-flop 80 may be a device no. SN 74279N. J-K flip-flops such as units 84, 86, 120 and 122 are device no. SN 7476N. Units 88, 90 and 92 are binary up/down counters and may each be implemented with a model SN 74191N. These three four-bit counters are connected in cascade so as to function as a single twelve-bit counter. Unit 110 is an eight-bit bistable latch and may be a device no. SN 74100N. BRM 118 may be implemented with an SN 7497N. The components enclosed by dashed rectangle 100 comprise an edge triggered J-K flip-flop which may typically be a device no. SN 7470N. Finally, NOR gates 96 and 98 may be implemented with device no. SN 7402N.

Details regarding the structure of sequence control 82 will be discussed below.

Figure 3:
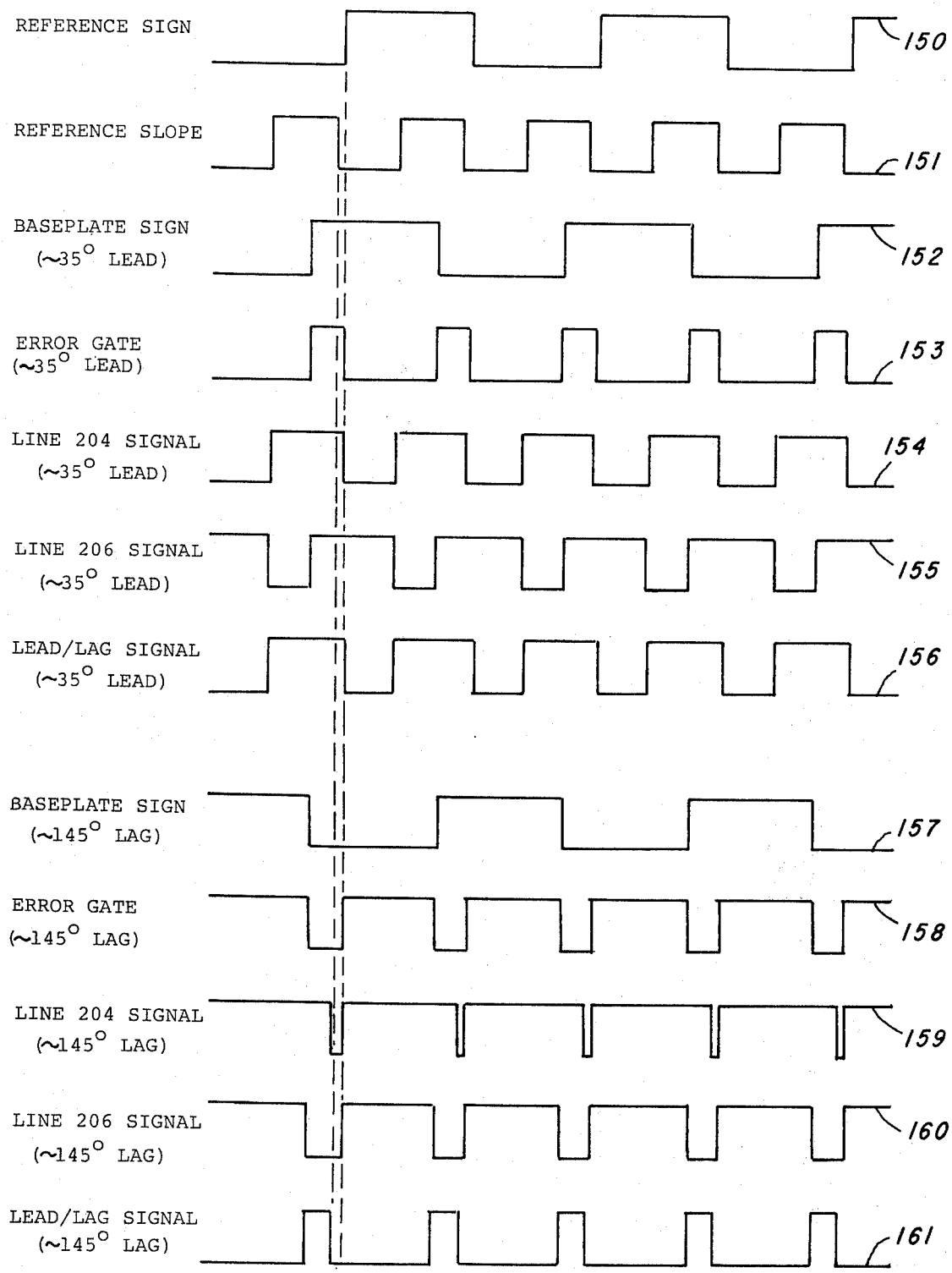
FIG. 3 shows waveforms associated with generation of the error gate and lead/lag signals.

Various signals appearing in the circuit of FIG. 2 are illustrated in FIG. 3. The reference sign 150 and reference slope 151 are inputs to the circuit of FIG. 2 and are provided on line 58 of FIG. 1 by function generator 10. In the preferred embodiment, during those time periods when no phase correction is being made, BRM 14 and its associated circuits will divide by eight the pulse repetition rate of the pulse train occuring on line 12 to produce the pulse train appearing on line 16. Binary counter 18 is a six bit counter and is therefore capable of producing binary output values ranging from 0 through 63. The 64 storage locations of ROM 22 contain samples of a sign wave equally spaced in time between the zero and ninety degree points of a sinewave. The initial value provided to D/A converter 26 by ROM 22 is the zero degree value of the sinewave and the first 63 pulses appearing on line 16 cause binary counter 18 to count up through its range, thereby clocking sequentially each of the sinewave samples in ROM 22 into D/A 26. It is seen, therefore, that the first 63 pulses appearing on line 16 cause the first ninety degrees of the sinewave to be clocked into D/A converter 26. At this point, since binary counter 18 has reached to top of its count range, its max/min output can be used to flip its own operation to the down count mode. The next 63 pulses appearing on line 16 then cause binary counter 18 to count down consequently clocking sinewave samples from ROM 22 into D/A converter 26 in descending order. In this way the sinewave samples between 90° and 180° are provided to the D/A converter. Subsequent pulses appearing on line 16 cause this process to be repeated cyclically such that the digital time series appearing on line 24 is representative of a full wave rectified sinewave. A sign bit is also provided to the D/A converter 26, this sign bit changing its value at the end of each cycle of the full wave rectified sine wave. This sign bit coupled with the digital full wave rectified sinewave appearing on line 24 enables the D/A converter to produce an analog output sinewave.

It will be seen from the foregoing that each sequence of 252 pulses appearing on line 16 will result in one full cycle of analog sinewave appearing on line 28. Since as discussed above, when operating in the non-correction mode, the pulse repetition rate appearing on line 16 is a factor of eight below that appearing on line 12, it will be seen that each sequence of 2,016 pulses appearing on line 12 will result in a full cycle of sinewave on line 28. Within the function generator itself, the pulse train output to line 12 is divided by a factor of 504 and the resultant pulse train is used to drive a first flip-flop. The output of this first flip-flop provides reference slope 151 of FIG. 3. Reference sign 150 is provided by the output of a second flip-flop which is driven by the first flip-flop. While, in the interest of clarity, the reference sign and reference slope waveforms are illustrated at a constant repetition rate, it should be noted throughout that their repetition rates will be increasing or decreasing in accordance with whether the source is operating in the upsweep or downsweep mode.

Operationally, one of the functions provided by the circuit of FIG. 2 is the generation of a lead/lag signal as represented by waveforms 156 and 161 of FIG. 3. Reference sign 150 and the baseplate sign are the inputs to exclusive OR gate 70. The baseplace sign is the signal appearing on line 54 of FIG. 1 and will appear as shown by waveform 152 of FIG. 3 when the phase of the baseplate signal leads that of the reference signal by approximately 35°. The output of exclusive OR gate 70 appearing on line 200 is the error gate signal as represented by waveform 153. This error gate signal, after inversion by inverter 72, forms one of the inputs to each of NAND gates 76 and 78. The reference slope appearing on line 210 provides the other input to NAND gate 78 and is inverted by inverter 74 before being applied to the other input of NAND gate 76. The two inputs to the set-reset flip-flop 80 appearing on lines 204 and 206 are shown by waveforms 154 and 155 respectively. An important operational feature is the fact that due to time delays in the logic circuits the reference sign signal 150 is slightly delayed in respect to the reference slope signal 151. This causes the negative going excursions of error gate signal 153 to lag the negative going excursions of reference slope signal 151 by some finite period of time. The operation of set-reset flip-flop 80 is such that negative going excursions appearing on the set input will cause the state of the Q output to go high and the $\overline{Q}$ output to go low. A negative going excursion appearing on the reset input will cause the Q output to go low and the $\overline{Q}$ output to go high. No change will occur when the flip-flop is already in the state to which it is commanded to go. It will be seen, therefore, that for the 35° lead situation, the $\overline{Q}$ output appearing on line 212 will take the form shown by waveform 156. This lead/lag signal appearing on line 212 is connected to the down/up inputs of binary counters 88, 90 and 92. As will be understood subsequently, the relevant portion of the lead/lag signals is that occurring during time periods when the error gate signal is in the high state. If the lead/lag signal occupies the high state during such time periods, it is regarded as indicating a lead condition. Accordingly, it is seen from the waveforms of FIG. 3 that when the phase of the baseplate signal leads that of the reference signal by approximately 35°, the lead/lag signal does indicate a lead state. This will be the case whenever the lead of the baseplate phase falls in the range zero to ninety degrees. The state of the lead/lag signal where the error gate signal is high is regarded as the "sense" of the phase error.

The lead/lag signal appearing on line 212 and supplied to the down/up inputs of binary counters 88, 90 and 92 will cause these counters to count down or up in accordance with whether the lead/lag signal is in the high or low state respectively.

Operation of the lead/lag circuit when the phase of the baseplate signal lags that of the reference signal by approximately 145° is illustrated by waveforms 157 through 161 of FIG. 3. It will be noted that the input to the set terminal of set-reset flip-flop 80 appearing on line 204 will occupy the low state only when both inputs to NAND gate 76 simultaneously occupy the high state; that is when both the inverted error gate signal and inverted reference slope simultaneously occupy the high state. As pointed out previously, there is a finite time delay between the time at which the reference sign and reference slope waveforms change state. Accordingly, the signal appearing on line 204 will undergo brief negative excursions in the 145° lag situation as illustrated by waveform 159. In this condition, a comparison of waveforms 158 and 161 shows that during the time period when the error gate signal is in the high state the lead/lag signal is in the low state thereby indicating a lag condition. Table 1 gives the condition of the lead/lag signal for the two phase situations considered above as well as for the situations of 90° to 180° lead and 0° to 90° lag. It will be seen from an inspection of TABLE 1 that the lead/lag signal occupies the high state, thereby indicating a lead condition, only when the phase of the base plate signal leads that of the reference signal by 0° to 90°. For all other conditions of lead or lag the lead/lag signal will occupy the low state thereby indicating that the error signal represents a lag condition.

Figure 4:
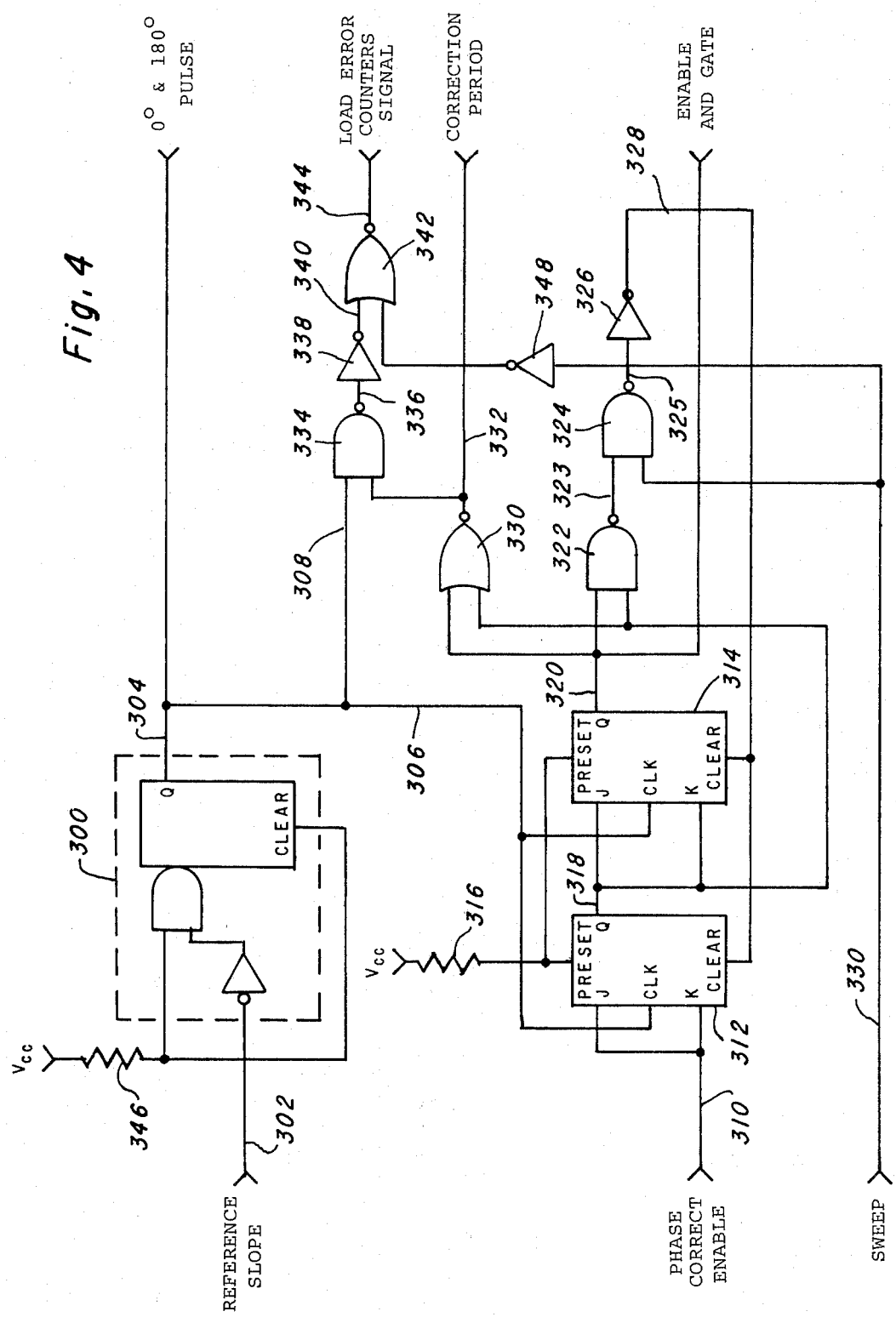
FIG. 4 is a circuit diagram of the sequence controller.
Figure 5:
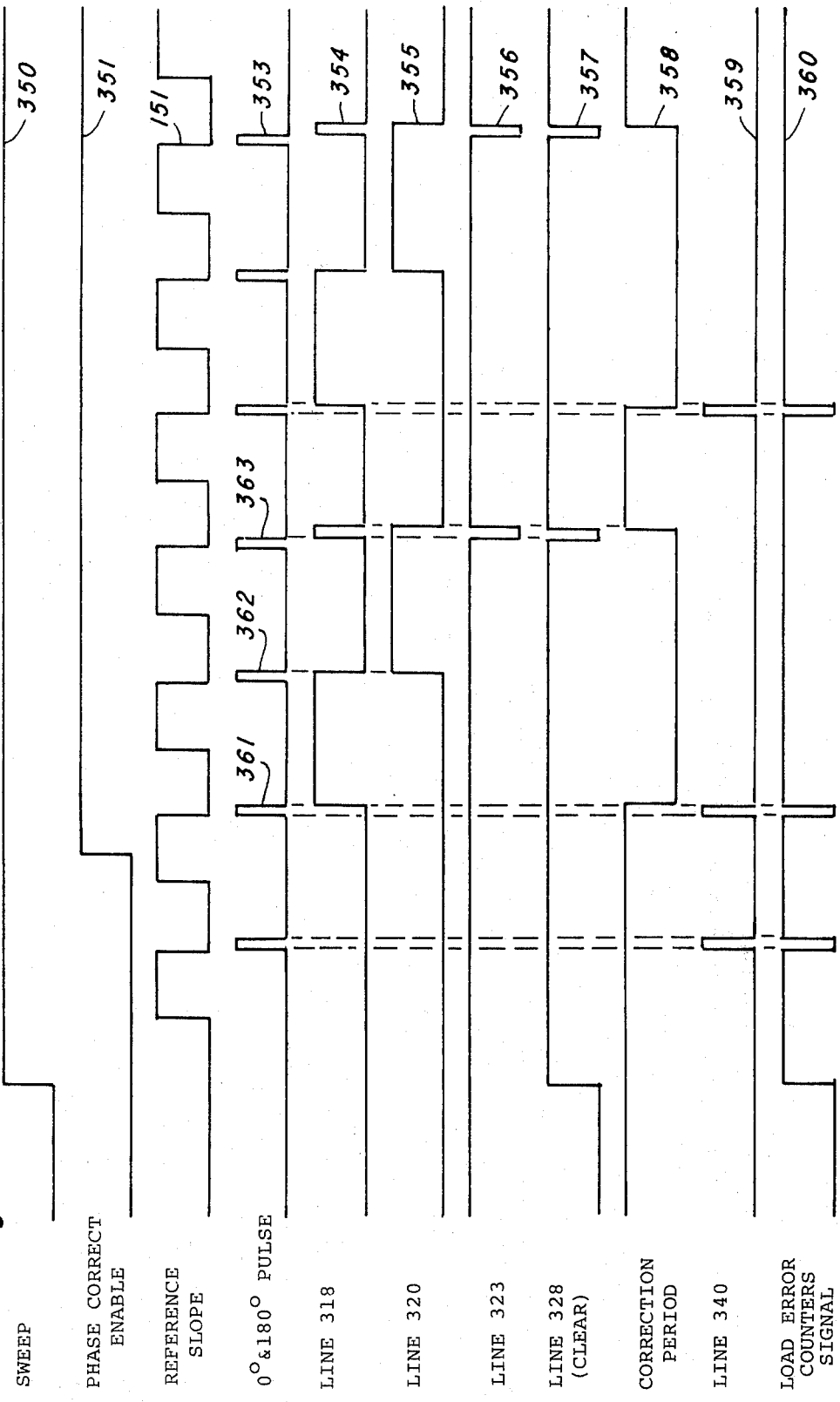
FIG. 5 illustrates sequence controller waveforms.

A circuit diagram of sequence control circuit 82 is shown in FIG. 4. FIG. 5 illustrates various logic signal levels associated with the sequence control circuit. The sweep signal provided to the sequence control circuit on line 330 is illustrated by trace 350 of FIG. 5. As is well known in the art of vibratory seismic source control, the sweep signal has a high level only during those times when it is desired to impart a vibratory signal to the ground. In addition to being used in the sequence control circuit, the sweep signal is also provided to function generator 10 of FIG. 1 for the purpose of initiating a pulse train on line 12. Only the first portion of the sweep signal is shown in FIG. 5, it being understood that the sweep signal level will return to the low state at the desired termination of the vibratory ground signal. A second signal provided to the sequence control circuit on line 310 is the phase correct enable signal shown by trace 351 of FIG. 5. In general, the phase correct enable signal will switch to its high state at some time after the initiation of the sweep signal. The reason for this delay is to enable the vibratory source mass to achieve a quasi-stable oscillatory mode of operation prior to initiating any attempts at phase correction. A third input to the sequence control circuit on line 302 is the reference slope shown by trace 151 of FIG. 5. The reference slope signal has been previously discussed in connection with the waveform diagrams of FIG. 3. Since, as has been pointed out above, the function generator 10 does not initiate a pulse sequence on line 12 until the sweep signal switches to its high state it follows that the reference slope signal in FIG. 5 does not begin switching between its low and high states until after the sweep signal has switched to its high state.

In the sequence control circuit diagram of FIG. 4 the components enclosed within rectangle 300 comprise a retriggerable monostable multivibrator which in the preferred embodiment is implemented with a Texas Instruments Incorporated part no. SN 74123N. J-K master-slave flip-flops 312 and 314 are SN 7476N units. NAND gates 322, 324 and 334 may each be implemented with an SN 7400 integrated circuit. Inverters 326, 338 and 348 are implemented by model no. SN 7404 while NOR gates 330 and 342 may be implemented by part no. SN 7402. The operation of the sequence control circuit may be understood with the aid of FIGS. 4 and 5. The precise timing relationships of the logic signals appearing in the sequence control circuit are emphasized in FIG. 5 by dashed lines running between the various waveforms. One input to the NAND gate of multivibrator 300 is maintained in the high state by external bias supply $V_{cc}$ through a suitable bias resistor 346. Operation of the multivibrator is such that when this input of the NAND gate is maintained in the high state, the Q output of the multivibrator 300 will remain low at all times except that a brief positive going pulse will occur each time that the inverted input to the NAND gate switches from its high to its low state. Accordingly, as shown by waveform 353, the Q output appearing on line 304 will be low except for brief periods when the reference slope waveform switches from its high to its low state. At such times there will be a short positive going pulse. This Q output appearing on line 304 comprises one output of the sequence control circuit referred to as the 0° and 180° pulse. This same output is coupled by line 308 to one input of NAND gate 334 and by line 306 to the clock inputs of J-K flip-flops 312 and 314.

The sweep signal 350 is coupled by line 330 to one input of NAND gate 324. During those times when the sweep signal occupies the low state the output of NAND gate 324 appearing on line 325 will be high while the inverted output appearing on line 328 will remain in its low state. This low logic level applied to the clear inputs of J-K flip-flops 312 and 314 will maintain the Q outputs of these two flip-flops in the low state. When the sweep signal switches to its high state it then becomes possible for the signal appearing on line 328 to also switch to the high state thereby permitting flip-flops 312 and 314 to switch in accordance with the signals appearing on their J, K and clock inputs. It will be noted that the preset inputs of both flip-flops 312 and 314 are maintained in the high state by external supply $V_{cc}$ and suitable bias resistor 316. The preset inputs therefore have no effect on the operation of the flip-flops.

Both the J and K inputs of flip-flop 312 are controlled by the phase correct enable signal appearing on line 310. When the phase correct enable signal is in the low state as it is during the early portions of waveform 351, flip-flop 312 is inhibited from changing its output state and it is seen by consideration of waveform 354 that the Q output of flip-flop 312 remains in its low state during these periods. The J and K inputs of flip-flop 314 are controlled by the Q output of flip-flop 312 through line 318. Accordingly, it is seen that flip-flop 314 is inhibited from changing its output state whenever the output of flip-flop 312 is in the low state. When the phase correct enable signal switches to the high state, flip-flop 312 is freed to begin changing its output state in response to clock pulses appearing on line 306. The change of output state for flip-flops 312 and 314 is completed on the negative going slope of the input clock pulses. Thus, as seen in waveform 354 the output of flip-flop 312 switches to the high state on the negative going slope of the first 0° and 180° pulse that occurs after the phase correct enable signal goes positive. This particular pulse in waveform 353 is indicated by reference designator 361. At the time of occurrence of pulse 361 the output of flip-flop 312 appearing on line 318 is still in the low state and therefore inhibits flip-flop 314 from changing state. The next 0° and 180° pulse, indicated by reference designator 362, causes flip-flop 312 to switch back to the low state. In this case, at the time of occurrence of the clock pulse, flip-flop 312 was in the high state and the output of flip-flop 314 is permitted to switch to the high state in response to clock pulse 362. The next 0° and 180° pulse 363 causes the output of flip-flop 312 to switch to the high state but again, in this case, flip-flop 314 is inhibited from changing its output state.

At this point it becomes important to consider the operation of NAND gates 322 and 324 along with inverter 326. As shown in FIG. 4, the outputs of flip-flops 312 and 314 are coupled to the inputs of NAND gate 322 by lines 318 and 320, respectively. The output of NAND gate 322 appearing on line 323 and shown by logic waveform 356 will be in the high state at all times except when both inputs to NAND gate 322 are in the high state. Consideration of logic waveforms 354 and 355 shows that the outputs of flip-flops 312 and 314 are not simultaneously high until the end of 0° and 180° pulse 363. At this time the output of NAND gate 322 appearing on line 323 switches to the low state as does the output of inverter 326 appearing on 328. This low signal applied to the clear inputs of flip-flops 312 and 314 immediately causes the Q outputs of both of these flip-flops to return to the low state. This immediately causes the signals appearing on lines 323 and 328 to return to the high state thereby freeing the clear input of flip-flops 312 and 314. At this point, the output of flip-flops of 312 and 314 as well as the signal appearing on line 328 occupy the same states as they did prior to the occurrence of 0° and 180° pulse 361. Accordingly, the sequence of operation of flip-flops 312 and 314 just described will be repeated in cyclic fashion as long as the sweep and phase correct enable signals occupy their high states. The output of flip-flop 314 appearing on line 320 is provided as a second output of the sequence control circuit, labelled enable AND gate.

The two inputs to NOR gate 330 are provided by the outputs of flip-flops 312 and 314. The output of the NOR gate appearing on line 332 will be low whenever either or both flip-flop outputs are in the high state. Accordingly, the waveform appearing on line 332 is logic waveform 358 of FIG. 5. This waveform comprises a third output from the sequence control circuit and is referred to as the correction period signal.

This correction period signal and the 0° and 180° pulse comprise the two inputs to NAND gate 334. The combination of NAND gate 334 and inverter 338 function as a single unit AND gate. Accordingly, the output of inverter 338 appearing on line 340 will take the form of logic waveform 359. This line 340 signal and the sweep signal after inversion by inverter 348 provide the two inputs to NOR gate 342 the output of which is the load error counter signal appearing on line 344 and shown by waveform 360.

As will be understood subsequently, the important feature of the load error counter signal is the low level pulse which occurs at the end of each high level state in the correction period signal. It should further be noted that once cyclic operation of the sequence control circuit begins, the correction period signal cyclically switches between the low and high states occupying the low state for a time equal to a full period of the reference waveform and the high state for a time equal to one-half the period of the reference waveform. The time during which the correction period signal occupies the low state will henceforth be referred to as the average period while the time during which it occupies the high state will be referred to as the correction period.

Returning to the circuit of FIG. 2 it will be noted that the pulse train output of function generator 10 appearing on line 12 of FIG. 1 is the frequency count input of FIG. 2 and is coupled by line 214 to the clock input of BRM 118. Output Y of BRM 118 appearing on line 216 is a second pulse train whose repetition rate is derived by multiplying the pulse repetition rate of the frequency count in accordance with the following relationship.

$$\text{Output Pulse Rep. Rate} = \text{Input Pulse Rep. Rate} \times \frac{32F+16E+8D+4C+2B+A}{64} \qquad (1)$$

where A, B, C, D, E and F are the individual bits of the rate input provided by exclusive OR gates 112 thorugh 117. This output pulse train appearing on line 216 passes through a divide by four network comprised of J-K flip-flops 120 and 122. The output of this divide by four network is labeled "output to counter" and provides the input to binary counter 18 of FIG. 1.

During the generation of a sweep signal, the circuits which provide the rate input to BRM 118 alternate cyclically between two modes of operation in response to the "correction period" signal appearing on line 220. During the average period the data outputs of latch 110 contain a binary number which is representaive of the decimal number 32. This binary number is coupled by exclusive OR gates 112 through 117 to the rate input of BRM 118. During this average period BRM 118 divides the pulse repetition rate of the pulse train on line 214 by a factor of two to produce the pulse train on line 216. At the beginning of the average period the binary count circuit comprised of binary counters 88, 90 and 92 will contain an output binary number representative of the decimal number 32. During this average period the binary count circuit updates its output binary number so as to be indicative of the amount by which the baseplate signal leads or lags the phase of the reference signal. At all times the output of exclusive OR gate 70, appearing on line 202, is a binary signal which occupies the high state during a portion of each cycle of the reference signal, the relative time in the high state being proportional to the degree of phase lead or lag of the baseplate signal. The output of set-reset flip-flop 80 appearing on line 212 will be high or low in accordance with whether the baseplate signal is considered to lead or lag the phase of the reference signal. This signal appearing on line 212 will cause binary counters 88, 90 and 92 to count down or up in accordance with whether the phase is considered to lead or lag. The signal appearing on line 202 coupled to the clear inputs of J-K flip-flops 84 and 86 will enable these flip-flops to pass the frequency count pulse train only for a portion of each cycle of the reference waveform which is proportional to the degree of phae lead or lag. During those times when J-K flip-flops 84 and 86 are passing the frequency count signal they function as a divide by four circuit on that signal. As a result, the pulse train appearing on line 218 and coupled to the input of binary count circuit will have an average pulse repetition rate which is proportional to the degree of lead or lag of the baseplate phase. Consequently, it will be seen that during the average period the output of the binary count circuit will be adjusted in accordance with the amount and direction of baseplate phase error. At the conclusion of the average period the circuit switches to a second mode of operation referred to as the correction period. During this period the binary count circuit is disabled from further counting and its output, which is repesentative of the degree of baseplate phase error, is coupled through latch 110 and exclusive OR gates 112 through 117 to the rate input of BRM 118. As a result, during the correction period which has a duration equal to that of one half cycle of the reference input, the multiplication factor used in BRM 118 will in general differ from one-half and in a direction which will ultimately cause the phase of the baseplate signal to speed up or drop back into phase with the reference signal. At the conclusion of the correction period the circuit reverts to the average period mode of operation and again compares the phases of the baseplate and reference signals so as to generate a new correction signal. While the circuit continues to alternate between the average and correction modes of operation throughout the duration of a sweep signal, the baseplate signal will generally be brought into phase after no more than two correction periods and will tend to remain approximately in phase throughout the remainder of a sweep.

Figure 6:
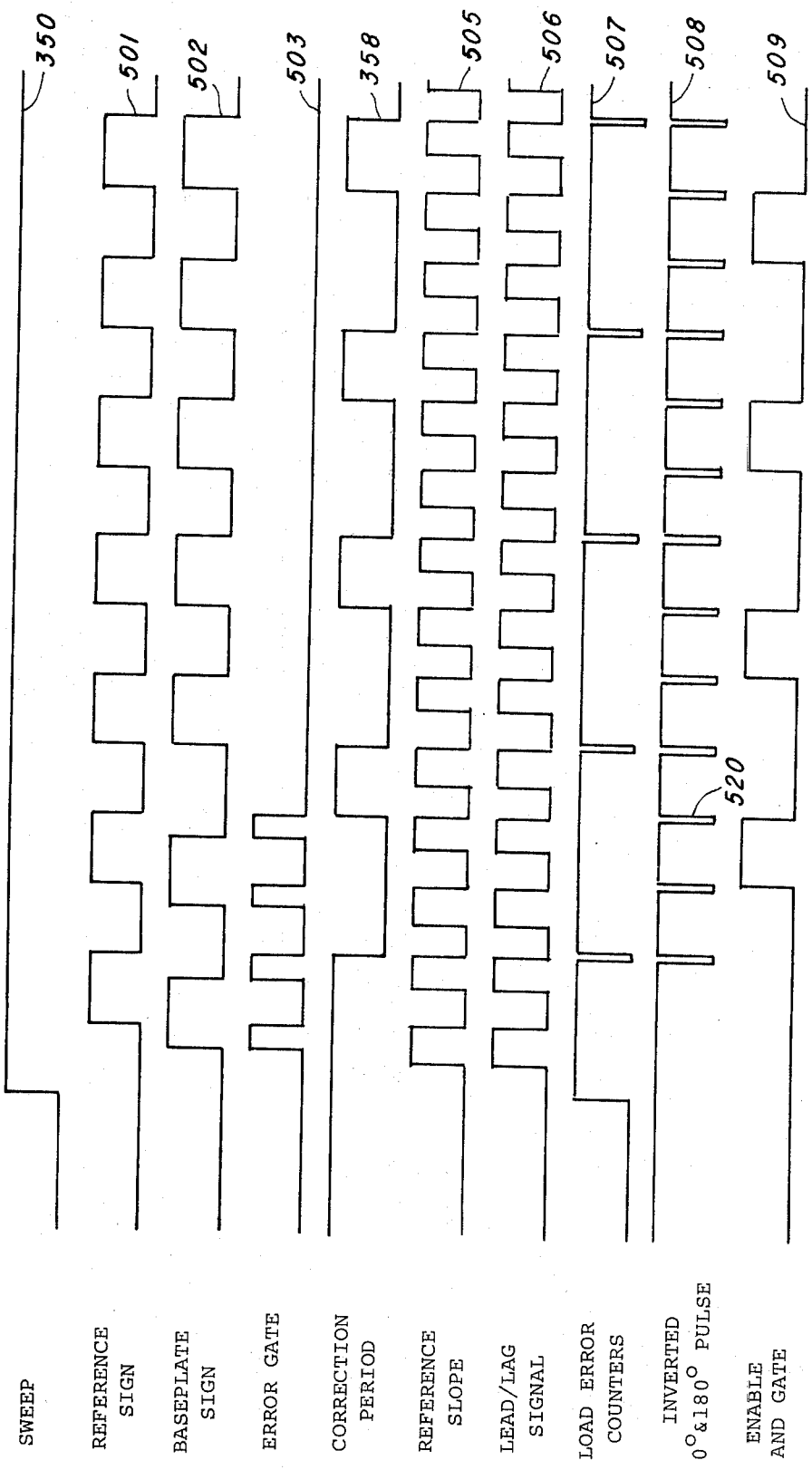
FIG. 6 shows phase controller waveforms.

A more detailed understanding of the operation of the circuit of FIG. 2 may be had with reference to the digital waveforms of FIG. 6. At the beginning of operation the sweep signal 350 occupies the low state. Under these conditions there will be no reference sign, baseplate sign, error gate, reference slope or lead/lag signals generated. Also, in accordance with the preceding discussion of sequence control 82 it will be seen that during this time the correction period signal 504 will occupy the high state.

The correction period signal is coupled by line 220 to the clock input of latch 110 and causes the data outputs of latch 110 to follow its data inputs whenever the correction period signal occupies the high state. The correction period signal is also coupled by line 220 to the enable inputs of binary counters 88, 90 and 92 and inhibits counting by these counters whenever the correction period signal occupies the high state.

Each of binary counters 88, 90 and 92 has a four bit output and has four load data inputs corresponding to its four output bits. Logic levels appearing on the data inputs are automatically loaded into the counter whenever the signal appearing on the load input of the counter is in the low state. The load error counter signal 507 is coupled by line 222 to the lod inputs of each of the three binary counters and is seen from FIG. 6 to be in the low state when the sweep input is in the low state. The six active bits used to provide the output from the binary counter circuit are the four bits of binary counter 90 and the two lowest order bits of binary counter 92. Although not shown in FIG. 2, the six data inputs corresponding to these six output bits are permanently set with a binary number 100000, that is 32 in the decimal system. Thus, whenever the load inputs of the binary counters are in the low state, binary number 32 wll be loaded into the relevant bits of the binary counters.

When the sweep signal switches to the high state the load error counter signal also goes high thereby freeing the binary counters from their data inputs. From waveform 358, however, the correction period signal is seen to remain high at this point thereby disabling the binary counters from counting the output of J-K flip-flop 86. During this time, therefore, the relevant bits of the binary counters retain binary numbr 32 which is passed through latch 110 and exclusive OR gates 112 through 117 to BRM 118. With the sweep signal in the high state, function generator 10 begins outputting a pulse train as well as the reference sign and reference slope signals shown by waveforms 501 and 505 of FIG. 6. The pulse repetition rate of the function generator output pulse train is divided by two in BRM 118 and further divided by four in the network comprised of J-K flip-flops 120 and 122. This results in the initiation of a signal imparted to the ground by the vibratory source and the activation of the baseplate sign signal shown by waveform 502 of FIG. 6.

Comparison of the first few cycles of waveforms 501 and 502 shows that the phase of the baseplate signal in this case is leading that of the reference signal by approximately 35°. In accordance with the preceding discussion of the error gate and lead/lag signals for the condition of 35° lead, these signals are seen to have the waveforms shown at 503 and 506 respectively.

After the phase correct enable signal switches to its high state (not shown in FIG. 6) the correction period signal switches to the low state on the trailing edge of the next 0° and 180° pulse (see FIG. 5), thereby initiating a first average period as shown in waveform 358. This has the effect of latching the data outputs of latch 110 to the binary number appearing on the data inputs of the latch at the time when the correction period signal switches to the low state. From the preceding discussion this is seen to be the binary number 32. With the correction period signal in the low state, binary counters 88, 90 and 92 are enabled to begin counting the pulse output of J-K flip-flop 86. As discussed previously, the divide by four network comprised of J-K flip-flops 84 and 86 will pass the frequency count signal only during those periods when the error gate signal occupies the high state. It follows that the binary counters will receive an active clock input only during such periods. Examination of waveforms 503 and 506 of FIG. 6 shows that the lead/lag signal occupies the high state at all times when the error gate signal is in the high state. Accordingly, the binary counters will count down in response to an active clock input, appearing on line 218.

It will be recalled that the frequency count output of function generator 10 4 2016 pulses during one full cycle of the reference waveform. Because of the divide by four action of J-K flip-flops 84 and 86 and in the 35° lead situation, because of the intermittent operation of these flip-flops in response to the error gate signal, only 98 pulses will appear on line 218 during the first average period. Since the least significant bit of the six bit binary number applied to latch 110 is the least significant bit of binary counter 90, then binary counter 88 functions to further divide the pulse repetition rate of the line 218 signal by a factor of sixteen. As a result, six pulses appear at the clock input of binary counter 90 during the first average period. Thus, the six bit output of the count circuit counts down to 26 from its initial value of 32 during the first full average period. It should be recalled, however, that during the average period the outputs of latch 110 are latched to their initial value 32, thereby maintaining a constant divide by two in BRM 118 during the full average period.

The operational description to this point has been independent of whether the vibratory source is operating in the upsweep or downsweep mode. For the remainder of the present discussion the vibratory source will be assumed to be operating in the upsweep mode, that is, it is generating a sinusoidal base plate signal with an increasing frequency. The sweep direction input to the network of FIG. 2 is a binary signal which occupies the low state when the vibratory source is functioning in the upsweep mode.

At the end of the first average period the correction period signal returns to the high state thereby initiating the first correction period. The high-level correction period signal inhibits the count circuit from counting during the duration of the correction period and further causes latch 110 to couple the binary number appearing at the output of the count network directly to the exclusive OR gates 112 through 117. In the present case this has been seen to be the binary number 26.

Edge triggered J-K flip-flop 100 provides an output signal on line 224 which controls the inverting/non-inverting operation of exclusive OR gates 112 through 117 and also controls the unity/cascade function of BRM 118 through NOR gate 98, and NAND gate 108. A low level signal to the clear input of J-K flip-flop 106 sets the Q output to a low logic level. When the system is operating in the upsweep mode the sweep direction input to NOR gate 96 is low. The load error counters signal from sequence control 82 appearing on line 222, after inversion by inverter 95, constitutes the other input to NOR gate 96. Therefore, the clear input to J-K flip-flop 106 will remain high except during each negative going pulse of the load error counter signal, that is, at the end of each correction period. Consequently, the Q output of J-K flip-flop 106 is cleared to zero only for a brief interval at the end of each correction period.

At all other times the state of the Q output of J-K flip-flop 106 is controlled by the state of its J & K inputs and is permitted to change in response to the signal appearing at the clock input. The clock input is the 0° and 180° pulse appearing on line 226 after inversion by inverter 94. The Q output is permitted to change only at each positive going edge of the clock input, that is, at the end of each pulse in the 0° and 180° pulse signal. As pointed out previously, edge triggered J-K flip-flop 100 in the preferred embodiment is a model SN 7470 integrated circuit. This circuit actually has three K inputs. For purposes of simplicity, only a single input is shown in FIG. 2 coupled through suitable bias resistor 126 to a positive reference level. This simply indicates that the three K inputs are permanently connected so as to always provide a high level K input to J-K flip-flop 106. Under these circumstances the Q output of J-K flip-flop 106 may change with a positive going edge of the clock input and will be set at a low logic level whenever the J input to the flip-flop is at a low logic level. Conversely, if the J input is at a high logic level when the clock pulse occurs, the Q output will be set to a level opposite that which it occupied prior to the occurrence of the clock pulse. It will be seen from FIG. 2 that the J input of the flip-flop will be high only when the signals on lines 228 and 230 are high and the signal on line 232 is low. The clock input to J-K flip-flop 106 is illustrated by waveform 508 of FIG. 6. Of particular interest here is pulse 520 which occurs at the beginning of the first correction period. The J input on line 232 is the error gate signal appearing at the output of exclusive OR gate 70. For the 35° lead condition this error gate signal is illustrated by waveform 503 of FIG. 6. For the purposes of the present discussion the error gate signal switches to the low state at the same time as the negative going edge of clock pulse 520. Since J-K flip-flop 106, however, changes state on the positive going edge of the clock pulse, it is seen that the error gate signal appearing on line 232 occupies a low level at the instant the flip-flop switches. Accordingly, this signal after inversion by inverter 102 presents a high level to one input of AND gate 104. A second input to AND gate 104 is the enable AND gate output of sequence control 82 appearing on line 230. The signal is shown by waveform 509 of FIG. 6. From FIG. 5 it is seen that this signal changes state after the occurrence of the corresponding 0° and 180° pulse. Accordingly, it is seen that at the instant when J-K flip-flop 106 is enabled to change state by 0° and 180° pulse 520, the enable AND gate signal is in the high state.

The third input to AND gate 104 is the max-min output of binary counter 92 appearing on line 228. During any given correction period this signal will occupy the high state only, if during the immediately preceding average period, the baseplate signal was leading or lagging the reference signal by 90° to 180°. For all other conditions of lead or lag during the immediately preceding average period this signal will occupy the low state during the next succeeding correction period.

In the case of the present illustration where it is assumed that the baseplate signal is leading by approximately 35°, it follows that the signal on line 228 will be in the low state at the time of occurrence of clock pulse 520. Accordingly, the J input of J-K flip-flop 106 is seen to be low and at the termination of clock pulse 520 the Q output of this flip-flop will be in the low state. This low level Q output is coupled by lines 224 and 234 to one input of each of exclusive OR gates 112 through 117. As a result, the data inputs appearing as the other input to each of these exclusive OR gates are passed uninverted to the rate input of BRM 118. From the preceding discussion it will be recalled that in the 35° lead case this rate input will be the binary number 26. Consequently, during this correction period the multiplier used in BRM 118 will be 26/64 rather than 32/64 as it is during an average period. This results in a lower than normal pulse repetition rate occuring on line 216. Consequently, the analog signal generated by binary counter 18, read only memory 22, and D/A converter 26 will be at a lower than normal frequency and the baseplate signal represented by waveform 502 is seen to drop back into phase with the reference signal represented by waveform 501. With these two signals now in phase there will be no error signal detected during subsequent averaging periods and the baseplate and reference signals will continue in phase during the remainder of the sweep signal. At the end of the correction period a negative going pulse occurs in the load error counters signal appearing on line 222. This reloads the binary number 32 into the binary counters in preparation for the next average period.

The operation of binary counter 92 which provides the appropriate max/min output on line 228 may be explained as follows. It will be recalled that the six bit data input to latch circuit 110 is provided by the four bit output of binary counter 90 along with the least two significant bits of binary counter 92. Also, as has been discussed previously, at the beginning of each average period these six bits are loaded with binary number 32. Thus, at the beginning of each average period the last significant bit of binary counter 92 will be set to zero while the second least significant bit will be set to one. At the same time, the two most significant bits of binary counter 92 are both set to one. If during a given average period the error signal is representative of a phase error of magnitude 90° to 180°, it is seen from Table I that the binary counters count up and that the six significant bits of these counters will be incremented from their initial value of 32 by at least 16. This results in the least significant bit of binary counter 92 changing from a 0 to a 1. When this occurs, all four bits of binary counter 92 are in the one state and the max/min output will switch to the high state representative of an overflow condition. For all other conditions of lead or lag, the least significant bit of binary counter 92 never switches to a 1 and the max/min output appearing on line 228 remains in the low state.

Continuing with the discussion of the upsweep mode of operation, slightly different circumstances occur when the baseplate signal is leading the reference signal by 90° to 180°. In this case, during the average period, whenever the error gate signal is high the lead/lag signal appearing on line 212 is low causing binary counters 88, 90, 92, to count up. At the end of such correction period the counter output to latch circuit 110 will be a binary number of value greater than 32. Again in this case at the beginning of the correction period, the error gate signal will be low and the output of inverter 102 will present a high level input to AND gate 104. Similarly, as in all cases, the enable AND gate signal appearing on line 230 will be high at the beginning of the correction period. In this case, however, the max/min output of binary counter 92 appearing on line 228 will also be high at the beginning of the correction period. It is seen, therefore, that all inputs to AND gate 104 are high in this case and the Q output of J-K flip-flop 106 will change state upon the occurrence of the clock pulse at the beginning of the correction period. It thus becomes necessary to ascertain the Q state prior to the occurrence of this clock pulse. Consideration of waveforms 508 and 509 of FIG. 6 shows that at the occurrence of the last clock pulse preceding the clock pulse at the start of a correction period the enable AND gate signal on line 230 is in the low state. Accordingly, this last preceding clock pulse has the effect of setting the Q output of J-K flip-flop 106 to a low level. Consequently, in the 90° to 180° phase error condition the clock pulse occurring at the beginning of the correction period will flip the Q output of flip-flop 106 to a high level. This high level coupled by line 234 to one input of each of exclusive OR gates 112–117 will cause these gates to invert the signals appearing on their data inputs. In the 90° to 180° lead condition the six data inputs to the exclusive OR gates represent a binary number of value equal to or greater than 48. After inversion the number input to the rate input of BRM 118 is a binary number equal to or less than 15. Consequently, the pulse repetition rate at the output of the BRM is again lower than normal and the baseplate signal will tend to drop back into phase with the reference signal.

The next situation to be considered is when the baseplate signal lags the reference signal by 90° to 180°. In this case, binary counters 88, 90 and 92 count up so that their contents at the end of the average period represent a binary number of value equal to or greater than 48. In this case the error gate signal at the beginning of a correction period as high, thereby presenting a low level through inverter 102 to AND gate 104. The resultant low level Q output of flip-flop 106 is coupled by line 224 to one input of NOR gate 98, the other input being the sweep direction signal which is also at a low level for the upsweep mode. The output of NOR gate 98 is coupled by line 236 to one input of NAND gate 108 and is high during the correction period in this case. Latch circuit 110, in the preferred embodiment, has eight active input and output terminals, only six being used for the purpose of data inputs and outputs. The max/min output of binary counter 92 is coupled by line 228 to one of the spare inputs of latch circuit 110 and the corresponding spare output is coupled by line 238 to the other input of NAND gate 108. Accordingly, during the correction period when the data inputs of latch circuit 110 are coupled to the data outputs the max/min output of binary counter 92 will appear on line 238. Since in the 90° to 180° lag situation the counters counted up during the average period it follows that the max/min output of binary counter 92 will be high during the correction period. With both inputs of NAND gate 108 high its output will be low during the correction period. This low level output is coupled by line 240 to the unity cascade input of BRM 118. With the unity cascade input in the low state during the correction period the BRM is inhibited from producing a pulse train on output line 216. Since the duration of the correction period is equal to the period of one-half cycle of the reference waveform this has the effect of causing the baseplate signal to drop back in phase by a full 180°. It will be recalled that the case under consideration is where the baseplate signal is lagging the phase of the reference signal by 90° to 180° before correction is made. It is clear that in this case the baseplate phase must drop back by 180° or more in order to reach synchronism. Accordingly, it is seen that for this condition of lead and lag, complete correction will not generally occur during the first correction cycle. In this case, therefore, additional correction will occur during the next correction cycle so as to bring the baseplate signal and reference signal into synchronism.

The last condition to be considered for the upsweep mode of operation is when the baseplate signal lags the reference wave signal by 0° to 90°. In this case the lead/lag signal is low during the high portions of the error gate signal, thereby resulting in binary counters 88, 90 and 92 counting up during the average period. Thus, at the end of the average period the binary number output by these counters will have a value greater than 32. Also, in this case at the beginning of the correction period the max/min signal appearing on line 228 will be low, thereby resulting in a low value of the Q output of flip-flop 106 during the correction period. Consequently, the data input passed by latch circuit 110 will also be coupled non-inverted by exclusive OR gates 112 through 117 to the rate input of BRM 118. In this case, therefore, the output pulse repetition rate of the BRM will be higher than normal and the resultant baseplate signal will speed up during the correction period so as to reach synchronism with the reference signal.

In summary it is seen from the preceding discussion that in the upsweep mode of operation phase errors are corrected by speeding up the baseplate signal only when the error condition is 0° to 90° of lag. For all other conditions of lead and lag the baseplate signal is slowed down so as to cause it to fall into synchronism with the reference signal. The various circuit conditions for the upsweep mode as well as the downsweep mode are summarized in Table I.

When operating in the downsweep mode, the sweep direction signal coupled to one input of NOR gate 96 is high. This has the effect of continuously holding the clear input of flip-flop 106 in the low state and consequently maintaining the Q output of this flip-flop in a low state. As a result, in the upsweep mode of operation for all conditions of lead and lag the exclusive OR gates 112 through 117 will couple the data output of latch circuit 110 non-inverted to the rate input of BRM 118. The high level sweep direction signal is also coupled to one input NOR gate 98 thereby holding the output appearing on line 236 continuously in the low state. The resultant high level at the output of NAND gate 108 is coupled by line 240 to the unity/cascade input of BRM 118 thereby permitting a pulse output from the BRM for all conditions of lead or lag.

In the downsweep mode if the baseplate signal is leading the reference signal by 0° to 90° the lead/lag signal is high during those times when the error gate signal is high. Consequently, the binary counters 88, 90 and 92 are caused to count down during an average period. The resultant lower than normal binary rate input to BRM 118 causes a lower than normal pulse repetition rate on line 216 during the next correction period. Consequently, for this condition of lead the baseplate signal is slowed down to achieve phase synchronsim.

For all other conditions of lead and lag in the downsweep mode it is seen from Table I that the lead/lag signal is low whenever the error gate signal is high. This results in the error counters counting up during the average period. The resultant higher than normal rate input to BRM 118 causes a higher than normal output repetition rate during the subsequent correction period. Accordingly, it is seen that the baseplate signal is speeded up in order to achieve phase synchronism in these cases.

It will be understood by those skilled in the art that there has been provided a method and system for automatically correcting the phase of the baseplate signal of a swept frequency vibratory seismic signal source. The invention achieves phase synchronism between the baseplate signal and a reference signal in such a way as to minimize the undesired effects of the frequency distortion which necessarily accompanies phase correction. The necessary phase correction is accomplished during the early portion of the frequency sweep with the baseplate and reference signals tending to remain in phase thereafter. Accordingly, when operating in the upsweep mode for most conditions of leading or lagging phase error the baseplate signal is slowed down in order to achieve phase synchronism. The lower frequencies introduced by this type of phase correction tend to fall below the bandpass of the desired sweep signal. It is only when the baseplate signal phase lags that of the reference signal by some small value that the baseplate signal is speeded up so as to achieve phase synchronism. In the preferred embodiment the line of demarcation between the slow down and speed up modes of phase correction is 90° of phase lag. It will be recognized by those skilled in the art that the threshold dividing the two modes of phase correction may be set at a value other than 90° of phase lag.

In the downsweep mode the converse method of phase correction is employed. When the phase of the baseplate signal leads that of the reference signal by 0° to 90° the baseplate signal is slowed down to achieve phase synchronism. For all other conditions of lead or lag the speed up method of phase correction is used. Thus, in the downsweep mode for all phase errors other than small values of phase lead the phase correction is such as to introduce frequency distortion which falls above the bandpass of the sweep signal.

TABLE I

| | UPSWEEPTS | |
|---|---|---|
| Baseplate Phase | circuit operation | BRM Pulse Output During Correction Period |
| Leading 0° to 90° | (1) Lead/Lad = Lead (2) Binary Counters Count Down (3) Rate Input to BRM Reduced | Slow Down |
| Leading 90° to 180° | (1) Lead/Lag = Lag (2) Binary Counters Count Up (3) Rate Input to BRM Reduced | Slow Down |
| Lagging 90° to 180° | (1) Lead/Lag = Lag (2) Binary Counters Count Up (3) BRM Output Inhibited | Slow Down |
| Lagging 0° to 90° | (1) Lead/Lag = Lag (2) Binary Counters Count Up (3) Rate Input to BRM Increased | Speed Up |

TABLE I-continued

```
                            DOWNSWEEPS
Leading 0° to 90°      (1) Lead/Lag = Lead
                       (2) Binary Counters Count
                           Down                    Slow Down
                       (3) Rate Input to BRM
                           Reduced
All Other Conditions   (1) Lead/Lag = Lag
                       (2) Binary Counters Count
                           Up                      Speed Up
                       (3) Rate Input to BRM
                           Increased
```

Whereas the present invention has been described with respect to specific embodiments thereof it will be understood that various changes and modifications will be suggested to one skilled in the art and it is intended to encompass such changes and modifications as fall within the scope of the appended claims.

What is claimed is:

1. A method for achieving a desired phase relationship between a reference signal and a feedback signal representing the baseplate motion of a swept frequency seismic source comprising:
   a. measuring the degree and sense of any existing phase error between said reference signal and said feedback signal,
   b. when said source is operating in an upsweep mode, and for any measured phase error falling within a range of phase errors having an extent greater than 180°, making a phase correction by slowing down the baseplate drive, and
   c. when said source is operating in a downsweep mode, and for any measured phase error falling within a range of phase errors having an extent greater than 180°, making a phase correction by speeding up the baseplate drive.

2. The method of claim 1 wherein the step of measuring is performed during an average period and the step of correction is performed during a subsequent correction period, and wherein the steps of measuring and correction are repeated cyclically.

3. An improved control system for maintaining the phase of the baseplate signal of a swept frequency vibratory seismic source relative to the phase of a reference signal comprising:
   a. comparison means for determining the phase angle between said baseplate signal and said reference signal,
   b. means responsive to an upsweep reference signal for generating a correction signal to speed up the baseplate drive signal when the phase of said baseplate signal lags that of said reference signal by more than a first threshold angle but less than a second threshold angle, the range between said first and second threshold angles being less than 180°, and
   c. said means for generating being further operative to provide a correction signal to slow down said baseplate drive signal for all other measured phase angles.

4. The control system of claim 3 wherein said first threshold angle is 0° and said second threshold angle is 90°.

5. The control system of claim 3 wherein said comparison means are operative during each of a plurality of average periods to determine a corresponding plurality of phase angles and said means for generating are operative during correction periods following each of said average periods to speed up or slow down the baseplate drive signal.

6. An improved control system for maintaining the phase of the baseplate signal of a swept frequency vibratory seismic source relative to the phase of a reference signal comprising:
   a. comparison means for determining the phase angle between said baseplate signal and said reference signal,
   b. means responsive to a downsweep reference signal for generating a correction signal to slow down the baseplate drive signal when the phase of said baseplate signal leads that of said reference signal by more than a first threshold angle but less than a second threshold angle, the range between said first and second threshold angles being less than 180°, and
   c. said means for generating being further operative to provide a correction signal to speed up said baseplate drive signal for all other measured phase angles.

7. The control system of claim 6 wherein said first threshold angle is 0° and said second threshold angle is 90°.

8. The control system of claim 6 wherein said comparison means are operative during each of a plurality of average periods to determine a corresponding plurality of phase angles and said means for generating are operative during correction periods following each of said average periods to speed up or slow down the baseplate drive signal.

9. A method for correcting phase error between a reference signal and the baseplate signal of a swept frequency vibratory seismic source comprising:
   a. measuring said phase error during an average period,
   b. when said reference signal is an upsweep signal, adjusting said baseplate signal during a subsequent correction period by speeding up the baseplate drive if the measured phase error represents baseplate lag between zero degrees and a first threshold angle and slowing down said baseplate drive if the measured phase angle represents baseplate lag between said first threshold angle and 360°, and
   c. when said reference signal is a downsweep signal adjusting said baseplate signal during a subsequent correction period by slowing down the baseplate drive if the measured phase error represents baseplate lead between zero degrees and a second threshold angle, and speeding up said baseplate drive if the measured phase angle represents baseplate lead between said second threshold angle and 360°.

10. The method of claim 9 wherein said first and second threshold angles are each ninety degrees.

11. The method of claim 9 wherein the steps of measuring and correcting the phase error are repeated cyclically.

12. A method for correcting phase discrepancies between a reference signal and the baseplate signal of a swept frequency vibratory seismic source operating in the upsweep mode comprising:
 a. measuring the angle by which the phase of the baseplate signal lags that of the reference signal during each of a plurality of average periods,
 b. after each of said average periods, speeding up the baseplate drive relative to said reference signal if the angle measured during the preceding average period is greater than zero degrees but less than a preselected threshold angle, and
 c. after each of said average periods, slowing down the baseplate drive relative to said reference signal if the angle measured during the preceding average period is greater than said preselected threshold angle but less than 360°.

13. The method of claim 12 wherein said preselected threshold angle is 90°.

14. A method for correcting phase discrepancies between a reference signal and the baseplate signal of a swept frequency vibratory seismic source operating in the downsweep mode comprising:
 a. measuring the angle by which the phase of said baseplate signal leads that of said reference signal during each of a plurality of average periods,
 b. after each of said average periods, slowing down the baseplate drive relative to said reference signal when the angle measured during the preceding average period is greater than zero degrees but less than a preselected threshold angle; and
 c. after each of said average periods, speeding up the baseplate drive relative to said reference signal if the angle measured during the preceding average period is greater than said preselected threshold angle but less than 360°.

15. The method of claim 14 wherein said preselected threshold angle is 90°.

16. In a control system for a swept frequency vibratory seismic source which comprises a function generator for providing a pulse train with a pulse repetition rate varying in accordance with the frequency of a reference signal, a counter responsive to the pulses of said pulse train, a read only memory containing samples of a sinusoidal signal and addressed by the count of said counter, and a D/A converter responsive to addressed samples from said read only memory for providing an analog drive signal to the baseplate excitation means of said vibratory seismic source, the improvement comprising:
 a. multiplier means for reducing by a variable factor the pulse repetition rate of the pulse train input to said counter,
 b. comparison means responsive to said baseplate and reference signals for providing an error signal representative of departures from a desired phase relationship therebetween,
 c. logic means responsive to said error signal for determining said variable factor of said multiplier means.

17. The improved control system of claim 16 wherein said comparison means generates a new error signal during each of a plurality of successive average periods, said logic means generating a new variable factor during each of said average periods, and each of said new variable factors are used in said multiplier means during a correction period following the corresponding average period.

* * * * *